US007908328B1

(12) United States Patent
Hulten et al.

(10) Patent No.: US 7,908,328 B1
(45) Date of Patent: Mar. 15, 2011

(54) IDENTIFICATION OF EMAIL FORWARDERS

(75) Inventors: Geoffrey J Hulten, Lynwood, WA (US); Anthony P. Penta, Bellevue, WA (US); David Maxwell Chickering, Bellevue, WA (US); Eliot C. Gillum, Los Gatos, CA (US); Gopalakrishnan Seshadrinathan, Redmond, WA (US); Jay T. Buckingham, Kirkland, WA (US); Joshua T. Goodman, Redmond, WA (US); Paul S Rehfuss, Seattle, WA (US); Robert L. Rounthwaite, Fall City, WA (US); Ryan C Colvin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1121 days.

(21) Appl. No.: 11/023,293

(22) Filed: Dec. 27, 2004

(51) Int. Cl.
*G06F 15/16* (2006.01)
(52) U.S. Cl. .......... 709/206; 709/204; 709/205; 709/207
(58) Field of Classification Search .......................... None
See application file for complete search history.

(56) References Cited

U.S. PATENT DOCUMENTS

| | | | | |
|---|---|---|---|---|
| 5,999,932 A * | 12/1999 | Paul | ............................. | 707/10 |
| 6,321,267 B1 * | 11/2001 | Donaldson | ................... | 709/229 |
| 6,658,454 B1 * | 12/2003 | Delany et al. | ................. | 709/202 |
| 6,678,729 B1 * | 1/2004 | Ahoor et al. | ................... | 709/224 |
| 7,051,077 B2 * | 5/2006 | Lin | ............................... | 709/207 |
| 7,072,944 B2 * | 7/2006 | Lalonde et al. | ............... | 709/206 |
| 7,257,564 B2 * | 8/2007 | Loughmiller et al. | ......... | 706/16 |
| 7,305,445 B2 * | 12/2007 | Singh et al. | ................... | 709/206 |
| 7,366,761 B2 * | 4/2008 | Murray et al. | ................ | 709/206 |
| 2003/0233353 A1 * | 12/2003 | Taylor | .............................. | 707/3 |
| 2005/0240617 A1 * | 10/2005 | Lund et al. | .................... | 707/102 |
| 2005/0262209 A1 * | 11/2005 | Yu | ................................. | 709/206 |
| 2006/0031319 A1 * | 2/2006 | Nelson et al. | ................ | 709/206 |
| 2006/0047766 A1 * | 3/2006 | Spadea, III | ................... | 709/206 |
| 2006/0059238 A1 * | 3/2006 | Slater et al. | ................... | 709/206 |

* cited by examiner

*Primary Examiner* — Rupal D Dharia
*Assistant Examiner* — Van Kim T Nguyen
(74) *Attorney, Agent, or Firm* — Lee & Hayes, PLLC

(57) ABSTRACT

Identification of email forwarders is described. In an implementation, a method includes using heuristics to identify email forwarders for use in a reputation system for locating spammers. In another implementation, a method includes determining a likelihood that a particular Internet Protocol (IP) address corresponds to an email forwarder and processing email originating from the particular IP address based on the determined likelihood. In a further implementation, a method includes collecting heuristic data that describes characteristics of emails sent from one or more Internet Protocol (IP) addresses and constructing a model from the heuristic data for identifying whether at least one of the IP address is an email forwarder. In yet a further implementation, a method includes identifying that a particular Internet Protocol (IP) address likely corresponds to an email forwarder and processing email from the particular IP address based on an implied sender of the email.

18 Claims, 6 Drawing Sheets

IDENTIFICATION OF EMAIL FORWARDERS

TECHNICAL FIELD

The present invention generally relates to the field of communication utilizing email and more particularly relates to identification of email forwarders.

BACKGROUND

Email has provided a wide range of increased functionality to users of computing devices, such as desktop computers, wireless phones, and so on. Email employs standards and conventions for addressing and routing such that the email may be quickly and efficiently delivered across a network (e.g., the Internet, a corporate intranet, and so on) utilizing a plurality of devices. In this way, a sender of the email incurs minimal costs to transmit the email to an intended recipient, even if the email is transmitted across the world. Because of this minimal cost and speed of delivery, the prevalence of email has continued to expand such that email is now considered an indispensable part of everyday life.

Unfortunately, as the prevalence of email has continued to expand, the amount of "spam" encountered by the user has also continued to increase. Spam is typically thought of as an email that is sent to a large number of recipients, such as to promote a product or service. As previously stated, because transmitting an email generally costs little or nothing to the sender, "spammers" have developed which send the equivalent of junk mail to as many users as can be located. Even though a minute fraction of the recipients may actually desire the described product or service, this minute fraction may be enough to offset the minimal costs in sending the spam. Consequently, a vast number of spammers are responsible for communicating a vast number of unwanted and irrelevant emails. Thus, a typical user may receive a large number of these irrelevant emails, thereby hindering the user's interaction with relevant emails. In some instances, for example, the user may be required to spend a significant amount of time interacting with each of the unwanted emails in order to determine which, if any, of the emails received by the user might actually be of interest.

To protect against spam, spam filters may be employed which filter the email based on a variety of considerations, such as sender address and number of emails sent from that sender address. One effective method is to observe the behavior of a sender over time; a sender that is responsible for a large number of spam messages accumulates a bad reputation and further mail from them can be filtered more aggressively. However, email forwarders (e.g. school alumni addresses) indiscriminately forward mail—both good and spam, and may erroneously accumulate a reputation of a spammer. Therefore, the spam filter may further complicate the user's interaction with the forwarded emails, such as removing the emails altogether, routing the forwarded emails to a spam folder, and so on.

Therefore, there is a continuing need for techniques that may be employed to identify email forwarders.

SUMMARY

Email forwarder identification techniques are described. As previously described, email that is consistently forwarded from another account may appear as spam. For example, in some cases, an IP-address based anti-spoofing check, such as Sender ID, on email forwarded from another legitimate account will fail, thereby indicating that the email forwarding account is a spammer, when it is not. Therefore, identification of email forwarders may be utilized to separate email forwarders from spammers. A variety of techniques may be employed to identify email forwarders. For example, the amount of email received from a particular internet protocol (IP) address over time may be compared to a percentage of email from the IP that a user classifies as spam. If the IP address sends a large amount of email and a large part of it is classified as spam by the user, then this may be utilized as an indication that the particular IP address is not a mailing list or a normal user, but instead may be an email forwarder. In another example, heuristics are used to analyze evidence variables (i.e., characteristics) of the particular IP address to determine if the characteristics are indicative that the particular IP address is likely to be an email forwarder. A variety of characteristics may be utilized, such as characteristics based on the IP address itself (e.g., how long the particular IP address has been operating), characteristics of email sent from the particular IP address (e.g., whether a spam distribution of the email from the particular IP address is similar to a spam distribution in email generally, email header content, number of recipients of the email), and so on.

BRIEF DESCRIPTION OF THE DRAWINGS

The same reference numbers are utilized in instances in the discussion to reference like structures and components.

DETAILED DESCRIPTION

Overview

Figure 1:
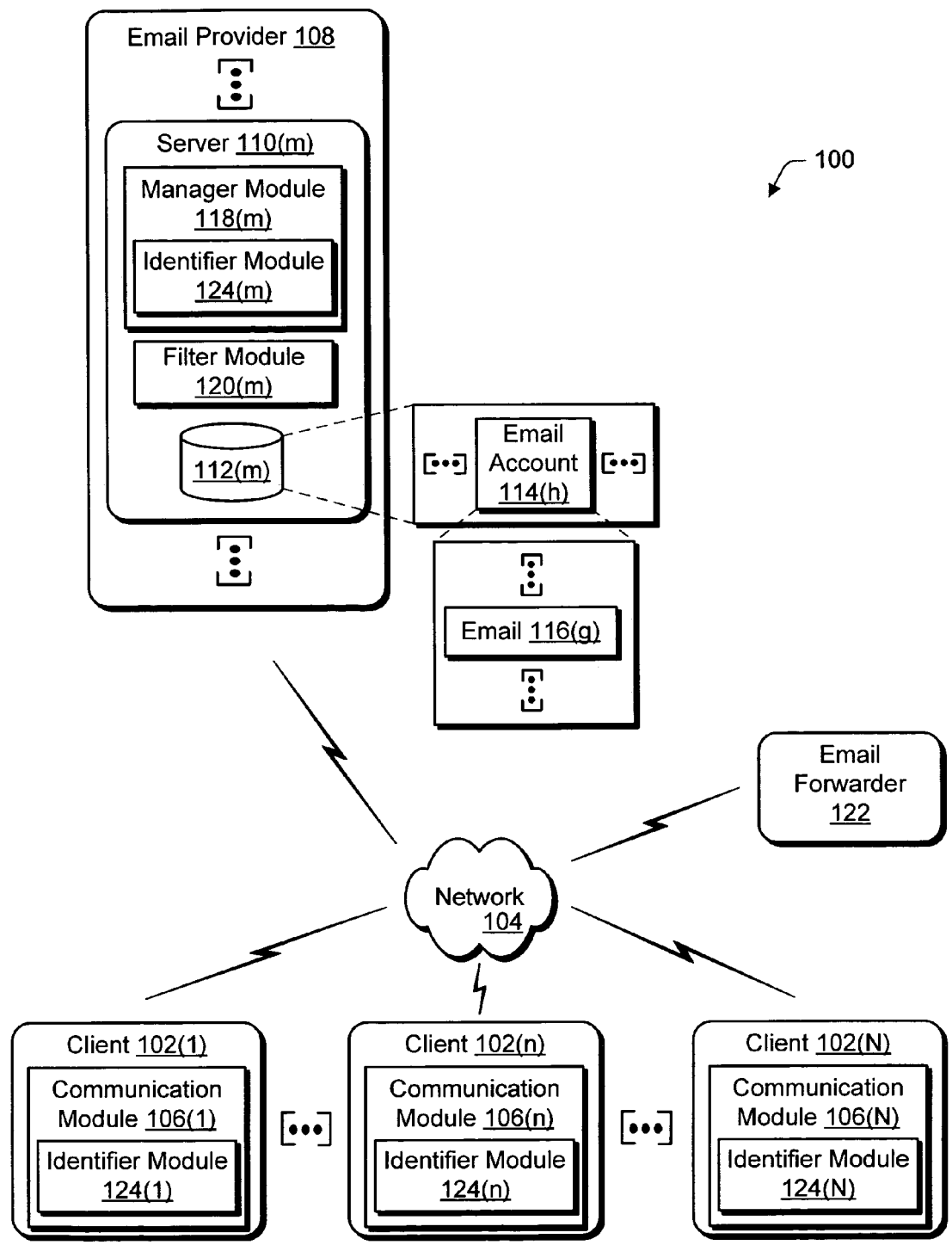
FIG. 1 is an illustration of an environment operable for communication of email and identification of email forwarders.

Email forwarders (e.g., an email server, an email server farm, and so on) provide functionality that allows a user to specify that email received for a particular email account is to be automatically resent to another account. A large source of such email forwarders is college alumni accounts. For example, consider a student who, while at school, used an email address of "student@example.edu". After the student graduates, the school may allow the student to automatically forward all the mail sent to the email address "student@example.edu" to some other address, such as "graduate@realworld.com".

Unfortunately, such automatic forwarding may result in the forwarding of relevant email sent to "student@example.edu"

as well as all the spam that was sent to the "graduate@realworld.com" address. Over time, other users that know the student may update their address books to point to the address "graduate@realworld.com" instead of "student@example.edu", thereby resulting in a decline in the relevant email traffic that is forwarded by "student@example.edu". However, the "student@example.edu" account may still continue to forward spam such that the email provider of "realworld.com" may find it difficult to distinguish "example.edu" from a spammer. Therefore, it was traditionally difficult to build a system for filtering spam that does not have a large number of false positives for email forwarders, such as by mistakenly marking email forwarders as spammers.

Additionally, email forwarders may interfere with anti-spoofing technologies, such as the use of a sender identifier (ID) by a spam filter to protect against spammers. For example, in a Sender ID example, a user of the account "user@non_spammer.com" may send a message to "student@example.edu". The IP address of the sender (e.g., "non_spammer.com") may be approved by the recipient (e.g., "example.edu") for receipt of emails from the "non_spammer.com" domain. However, the "student@example.edu" account may then forward the message to "graduate@realworld.com". The email provider of "realworld.com", upon receipt of the email, may notice that the email claims to originate from "non_spammer.com" but was actually sent by an IP address at "example.edu". Therefore, a check for a permitted Sender ID in such an instance may fail, even though the email may have been originally sent from a permitted sender, e.g., "user@non_spammer.com". Thus, this may result in the marking of the email by a spam filter. Although alumni email forwarders have been described in this example, a variety of systems may permit email forwarding functionality, such as Internet Service Providers (ISPs), email modules that are executed locally by a client without interacting with an email server, and so on. In an implementation, Sender ID describes headers that may be added by forwarders to avoid this problem, but that typical forwarders do not add these headers.

Identification of email forwarders may be utilized to provide a wide variety of functionality. For instance, an email forwarder, once identified, may receive special treatment by spam filtering systems. For example, once "example.edu" is identified as an email forwarder, emails from "example.edu" may receive special scrutiny such that the emails are not automatically deleted for failure of the sender ID to match the IP address of the email forwarder.

The functionality for identifying email forwarders may assume a variety of configurations and utilize a variety of techniques. For example, identifying functionality may employ a series of heuristics and features for building models (e.g., machine-learning models) that are then used for identifying email forwarders. For instance, an email provider for "realworld.com" may examine emails being sent from "example.edu" over time and determine that there is a good chance that at least some of the email is being forwarded. In response to this identification, the email provider of "realworld.com" may adjust how future emails received from "example.edu" are handled, such as to become more conservative. For example, "realworld.com" may be configured such that an email from "example.edu" is not penalized as stringently if it fails an anti-spoofing check, such as by routing the email to a spam folder instead of automatically deleting the email. A variety of other identification techniques may be employed for identifying email forwarders, further discussion of which may be found in relation to FIG. 2.

Exemplary Environment

FIG. 1 is an illustration of an environment 100 operable for communication of emails across a network. The environment 100 is illustrated as including a plurality of clients 102(1), . . . , 102(n), . . . , 102(N) that are communicatively coupled, one to another, over a network 104. The plurality of clients 102(1)-102(N) may be configured in a variety of ways. For example, one or more of the clients 102(1)-102(N) may be configured as a computer that is capable of communicating over the network 104, such as a desktop computer, a mobile station, a game console, an entertainment appliance, a set-top box communicatively coupled to a display device, a wireless phone, and so forth. The clients 102(1)-102(N) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(1)-102(N) may also relate to a person and/or entity that operate the client. In other words, client 102(1)-102(N) may describe a logical client that includes a user and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, clients 102(1), 102(n) may be communicatively coupled via a peer-to-peer network to communicate, one to another. Each of the clients 102(1), 102(n) may also be communicatively coupled to client 102(N) over the Internet. In another instance, the clients 102(1), 102(n) are communicatively coupled via an intranet to communicate, one to another. Each of the clients 102(1), 102(n) in this other instance is also communicatively coupled via a gateway to access to client 102(N) over the Internet.

Each of the plurality of clients 102(1)-102(N) is illustrated as including a respective one of a plurality of communication modules 106(1), . . . , 106(n), . . . , 106(N). In the illustrated implementation, each of the plurality of communication modules 106(1)-106(N) is executable on a respective one of the plurality of clients 102(1)-102(N) to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from a sender to a recipient.

In an implementation, the communication modules 106(1)-106(N) communicate emails through use of an email provider 108. The email provider 108 may include a plurality of servers 110(m), where "m" can be any integer from one to "M". The plurality of servers 110(m) may be configured to provide a wide variety of functionality, such as through configuration as a server farm (i.e., a server cluster) that provides load balancing and failover. One or more of the plurality of servers 110(m) in the email provider 108 may include a respective database 112(m) for storing a plurality of email accounts 114(h), where "h" can be any integer from one to "H". Each of the email accounts 114(h) may be configured to store a plurality of emails 116(g), where "g" can be any integer from one to "G", that are configured for communication between the plurality of clients 102(1)-102(N).

Client 102(1), for example, may execute communication module 106(1) to form an email intended for client 102(n). The communication module 106(1), when executed on the client 102(1), transmits the email over the network 104 to the email provider 108. The email provider 108, upon receipt of the email, executes the manager module 118(m) to store the email in an email account 114(h) that corresponds to the client 102(2). Client 102(n) may then execute the communication module 102(n) to retrieve the email from the corresponding email account 114(h). For example, client 102(n) may "log on" to the email provider 108 (e.g., by providing a user identification and password) and retrieve emails from the email account 114(h). In a further instance, the client 102(n) pulls the email from the email provider 108 (and more particularly the manager module 118(m)). In some cases, email may be delivered to an email forwarder 122 instead of an email provider 108. Typically, but not necessarily, email forwarders 122 are also email providers 108. The email forwarder 122 will then deliver the email to an email provider (108).

The efficiency of the environment 100 in communicating email, however, has also resulted in communication of unwanted email, commonly referred to as "spam". Spam is typically provided via email that is sent to a large number of recipients, such as to promote a product or service. Thus, spam may be thought of as an electronic form of "junk" mail. Because a vast number of emails may be communicated through the environment 100 for little or no cost to the sender, a vast number of spammers are responsible for communicating a vast number of unwanted and irrelevant messages. Thus, each of the plurality of clients 102(1)-102(N) may receive a large number of these irrelevant emails, thereby hindering the client's interaction with actual emails of interest.

One technique which may be utilized to hinder the communication of unwanted emails is through the use of a filter module 120(m). The filter module 120(m), for example, is executable to monitor communication of emails to determine whether the communicated emails are spam, such as through monitoring communication of emails themselves (e.g., a particular email sender sends a multitude of emails), receipt of feedback from the clients 102(1)-102(N) which indicates that particular emails are spam, and so forth. However, an email forwarder 122 may have similar characteristics of a spammer. Therefore, the filter module 120(m) may treat emails received from the email forwarder 122 as spam.

To identify emails forwarders, the email provider 108 may include an identifier module 124(m). The identifier module 124(m), when executed, may utilize a variety of techniques to identify the email forwarder 122. For instance, the identifier module 124(m) may receive user feedback from the plurality of clients 102(1)-102(N) which identifies whether particular emails received by the clients 102(1)-102(N) are forwarded from the email forwarder 122, are spam, are from a permissible sender, and so forth. This user feedback may be utilized by the identifier module 124(m) as a heuristic for identifying whether emails currently being communicated are from the email forwarder 122. A wide variety of other techniques may also be utilized to identify the email forwarder 122, further discussion of which may be found in relation to FIG. 2.

Upon identification of the email forwarder 122, the identifier module 124(m) may take a variety of actions. For example, the identifier module 124(m) may indicate to the filter module 120(m) (e.g., provide a hint) that an email is likely from the email forwarder 122. Therefore, the filter module 120(m) may take this into consideration when further processing the email. In another example, the identifier module 124(m) may limit actions that may be taken by the filter module 120(m), such as indicate that email from the email forwarder 122 is not to be deleted no matter what the result of the processing by the filter module 120(m). A variety of other actions may also be performed, further discussion of which may be found in relation to FIG. 5.

Although the identifier module 124(m) is illustrated as included within the manager module 118(m), the identifier module 124(m) may be configured as stand alone software. Further, each of the plurality of clients 102(1)-102(N) may include a respective one of a plurality of identifier modules 124(1)-124(N) which are executable to provide similar functionality as execution of the identifier module 124(m) on the server 110(m).

Generally, any of the functions described herein can be implemented using software, firmware, fixed logic circuitry, manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the identifying strategies described below are platform-independent, meaning that the strategies may be implemented on a variety of commercial computing platforms having a variety of processors.

Figure 2:
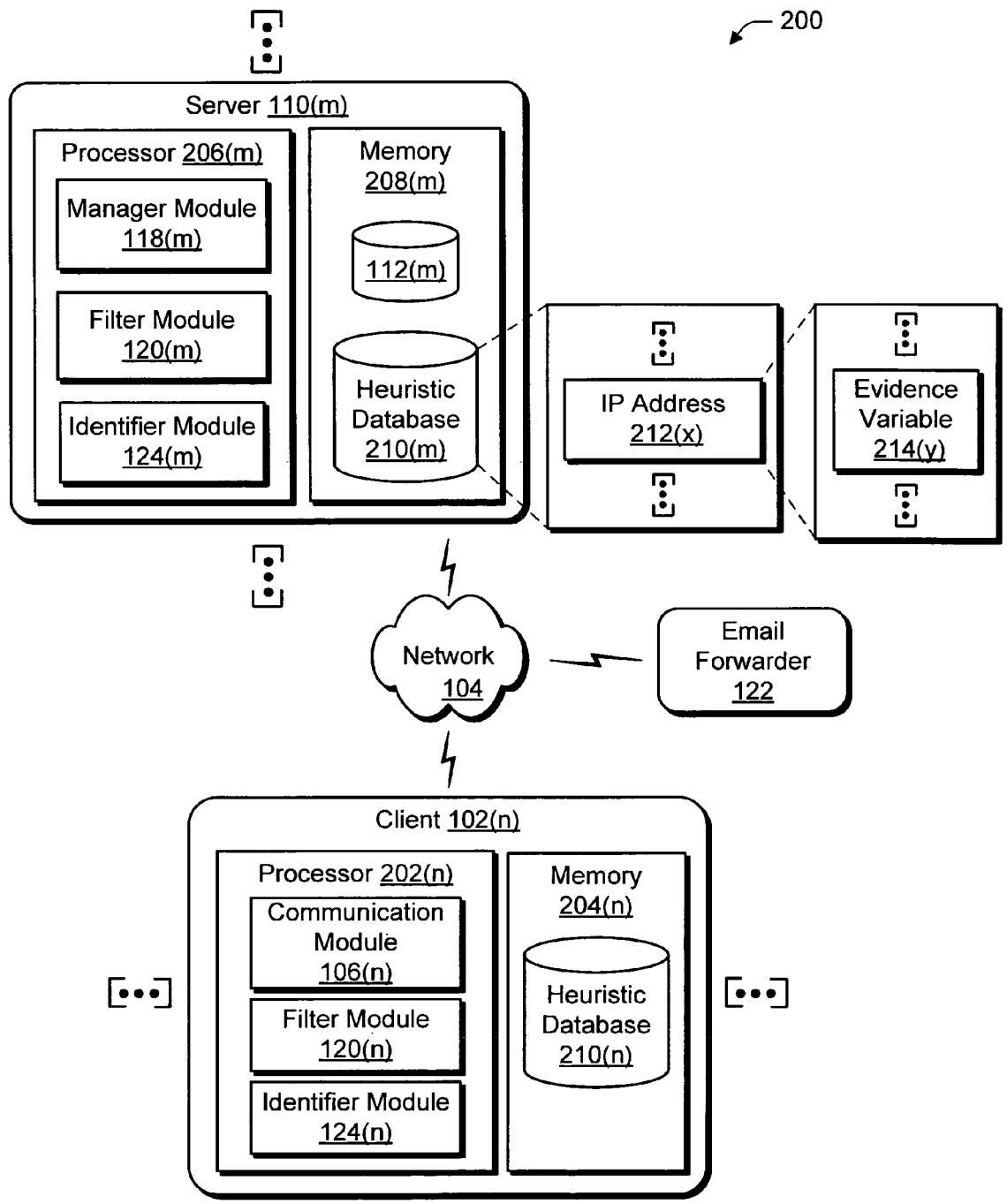
FIG. 2 is an illustration of a system in an exemplary implementation showing the plurality of clients and the plurality of servers of FIG. 1 in greater detail.

FIG. 2 is an illustration of a system 200 in an exemplary implementation showing the plurality of clients 102(n) and the plurality of servers 110(m) of FIG. 1 in greater detail. Each of the plurality of clients 102(n) of FIG. 2 is illustrated as including a respective processor 202(n) and memory 204(n). Likewise, each of the plurality of servers 110(m) is illustrated as including a respective processor 206(m) and memory 208(m). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204(n) is shown for the client 102(n) and a single memory 208(m) is shown for the server 110(m), the memories 204(n), 208(m) may represent a wide variety of types and combinations of memory devices, such as random access memory (RAM), hard disk memory, removable medium memory, and so forth, and therefore are not limited to a single memory device.

The server 110(m) is illustrated as executing the manager module 118(m), the filter module 120(m), and the identifier module 124(m) on the processor 202(n), each of which is also storable in memory 208(m). The identifier module 124(m), when executed, may employ a variety of techniques to identify the email forwarder 122. For example, the identifier module 124(m) may be executed to determine whether a particular IP address likely corresponds to an email forwarder based on user feedback from the plurality of clients 102(n) about the quantity of spam from the particular IP address. For instance, the identifier module 124(m) may utilize an assumption that in most instances, a single spammer does not repeatedly send spam to the same email account. In another example, execution of the identifier module 124(m) to identify the email forwarder is based on properties of emails sent from the particular IP address over a period of time. For instance, the identifier module 124(m) may aggregate such data from the plurality of email accounts 114(h) of FIG. 1. It should be noted that these examples may be combined in environments having both user feedback and long-term aggregate statistics. Each of these examples is discussed in turn in a corresponding section of the following discussion.

Heuristics for Finding Forwarders Based on User Feedback

The server 110(m) is illustrated as having a heuristic database 210(m) which may be utilized to store data that describes characteristics of past emails that were communicated to the plurality of clients 102(n) and/or by the email provider 108 of FIG. 1. For example, the manager module 118(m) may be executed to store feedback received from the plurality of clients 102(n) indicating whether particular emails are spam, forwarded, relevant, and so on. The manager module 118(m) stores this feedback in the heuristic database 210(m) as indexed by the particular one of a plurality of IP addresses 212(x), where "x" can be any integer from one to "X", which sent the email. The identifier module 124(m), when executed, may then examine the heuristic database 210(m) to determine whether the feedback indicates that a particular IP address 212(x) is an email forwarder, a spammer, or neither.

The identifier modules 124(m), for example, may use heuristics and an assumption that spammers typically do not repeatedly send spam to the same email account to identify whether a particular IP address 212(x) is an email forwarder. For instance, the identifier modules 124(m) may mark a particular IP address 212(x) as an email forwarder if the particular address 212(x) sends more than "N" emails to a single client 102(n) (i.e., the client's email account) in "D" days where the client 102(n) marks more than "P" percent of the email received from that particular address 212(x) as spam. The exact values for the parameters "N", "D", and "P" may vary over time as the nature of email changes and from data source to data source. In one exemplary implementation, the parameters have the following values: N=5, D=130, and P=80%. The parameter "P" may be used to reduce the number of mailing lists and peer-to-peer communications that are erroneously marked as email forwarders. It should be noted that a wide variety of other techniques for detecting forwarders may also be utilized.

Heuristics for Finding Forwarders with IP Address Property Aggregation

In this example, all email from a particular IP address 212(x) is monitored over a period of time. Characteristics of the email are aggregated into a corresponding set of evidence variables 214(y), where "y" can be any integer from one to "Y". One or more models may then be constructed using these evidence variables 214(y) to identify email forwarders.

In the following examples, most of the evidence variables 214(y) used in the models derive from characteristics of email forwarders and should be viewed as specific examples of larger classes of features. Therefore, the following discussion describes specific examples of a variety of possible evidence variables 214(y) that may be utilized to identify email forwarders.

Small Number of Recipients

A small number of recipients per message sent from the particular IP address 212(x) may indicate that the IP address 212(x) is an email forwarder and not a spammer. For instance, it is typical that forwarded emails go to a single recipient, whereas mail from spammers may go to a single recipient, or more commonly, to a large number of recipients. Additionally, another evidence variable may describe a maximum number of recipients on any message from the IP address 212(x) and use this information to determine whether the IP address 212(x) is an email forwarder or a spammer.

Further, there are multiple kinds of recipients which may be specified in an email, one of which is a protocol level recipient. An email, for instance, typically includes a "To" and "CC" line. When an email is forwarded, the "To" and "CC" lines of the original email are typically preserved. In additional to these lines, there is a "receipt to" command (i.e., "RCPT TO") which exists at a protocol level. When one email system communicates with another email system, for example, the email systems typically look only to the "RCPT TO" line, and ignore the "To" and "CC" lines. If an email is being forwarded, a "RCPT TO" command may not match the "To" line, but the "RCPT TO" generally specifies a single recipient. Therefore, matching the protocol level recipient with the "To" line and the number of recipients specified in the email may be indicative of whether the IP address 212(x) is an email forwarder. In this way, combinations of evidence variables may be utilized to identify an email forwarder.

Indication of Forwarding Included in the Email

An email itself may also include an indication that the email was forwarded. For example, the email may include a specific indication, such as through inclusion of a "forwarding" header. Additionally, as previously described, a "sender ID" check will typically fail for a forwarded message, i.e., the "To" line does not match the IP address of the IP address, from which, the email was received. Further, because headers are typically preserved, the inclusion of multiple headers may indicate that the email was forwarded.

Spam Distribution More Like Distribution of Email as a Whole

The distribution of email messages from an IP address 212(x) as a whole may also indicate whether the IP address 212(x) is an email forwarder. For example, the identifier module 124(m) may determine, through examination of the heuristic database 210(m), that an email forwarder typically sends emails to 100 or fewer email accounts 114(h) of the email provider 108 of FIG. 1, while a spammer typically sends emails to well over a million different email accounts 114(h).

In another example, distributions may be determined from the plurality of IP addresses 212(x) which indicate whether a particular IP address 212(x) is an email forwarder or a spammer. For example, a distribution of "From" lines and "From" domains (e.g., a plurality of messages from different domains but same IP address) may be utilized to indicate whether the IP address 212(x) is an email forwarder.

Further, values obtained from the filter module 120(m) may also be used to identify an email forwarder. For example, the filter module 120(m) may output values indicating a likelihood of whether a sender is a spammer, which may also be stored in the heuristic database 210(m). Distributional features like standard deviation of these values for the emails from a given sender, divergence of the distribution of these values from a uniform distribution, and so on may be utilized to identify whether a particular IP address 212(x) is an email forwarder or a spammer.

Domain Names

Some domain names themselves may be indicative of forwarders. For example, as described in the initial example, educational institutions are one of the most common email forwarders. Therefore, a sender domain name (e.g., as indicated in the "HELO" string which is further described below) in the email that is in the ".edu" domain may indicate that the IP address 212(x) likely corresponds to an email forwarder. The sender domain may be determined in a variety of ways. For example, the identifier module 124(m) may examine a header in the email which indicates the source of the email. However, this header is potentially spoofable by malicious parties.

In another example, the identifier module 124(m) may perform a reverse domain name service (DNS) look-up by querying a domain name service to determine the domains that are hosted on a particular IP address. When an email system initially communicates with another email system, the receiving system knows the IP address of the computer that connected to deliver the email. The receiving computer may perform a reverse DNS lookup on this IP address and, for instance, discover that the connecting IP (e.g., 1.2.3.4) is serving the domain "mail.stateuniversity.edu". If so, the identifier module 124(m) may determine that the sender is more likely to be an email forwarder. Further, if the result of the reverse DNS lookup matches the HELO address this is further evidence that the sender is not a spammer and thus may be an email forwarder.

The identifier module 124(m) may also query a DNS to ask what IP address is serving "mail.stateuniversity.edu", which may be referred to as a "forward" DNS lookup. The identifier module 124(m) may then compare a result from the DNS with an IP address listed as the sender of the email or with the IP address that it knows connected to it to deliver the email. If the forward DNS resolves (i.e., the IP address of the sender matches the IP address of record for that sender in the DNS), it is more likely the sender is not a spammer. Thus, this evidence variable may be given further weight in determining whether the email is sent from an email forwarder.

Personal/Small Business Computers are Typically not Email Forwarders

Personal and small business computers are typically more susceptible to attacked from malicious parties. Therefore, a reverse DNS look-up and other techniques may be utilized to determine whether an IP address corresponds to access from a home and therefore is more likely to be a spammer and not an email forwarder. In particular, typically, home and small business computers are connected via Cable or DSL lines or dialup services. Presence of a word such as Cable or DSL or dialup in the reverse IP address, or several other heuristics, can be used to guess that this is a cable or DSL line, and thus a home or small business, and thus unlikely to be a forwarder. In addition, there are lists of Cable and DSL and dialup lines commercially available which may be consulted.

Email Forwarders are Typically Provided from Well-Established Sites

Although email forwarding may be provided by the clients 102(n) as previously described, in most instances email forwarders are typically well-established sites that have been in existence for a significant period of time. Therefore, the amount of time that the IP address 212(x) has been sending emails may be indicative of being an email forwarder.

Forwarders Often Send Regular Email as Well as Forward Email

The identifier module 124(m) may be executed to track the portion of email with each number of received header lines that seem to be spam. These portions may be compared to the total portion of the mail that is spam. If most of the good email has the minimum number of received lines, this may be indicative of an email forwarder. In addition, as email goes from one server to another, received lines are added to the headers. Email that is forwarded has a larger minimum number of received lines. If the number of received lines is not larger than this minimum, this may be indicative that this IP address 212(x) is not an email forwarder, and therefore could be a spammer.

Email Forwarders are Typically not Also Spammers and Therefore do not Use Spammer Tricks Spammers often utilize tricks, such as protocol-level tricks, to try to defeat spam filters. For instance, spammers often randomize the "HELO" string to defeat identification of a filter module that a particular machine name corresponds to a spammer. Therefore, if the "HELO" string is always or nearly always the same, this may be indicative that the corresponding machine is not a spammer. In another instance, a reverse and/or forward DNS lookup "hard" matches (i.e., exactly matches) "HELO" string as previously described. In a further instance, the reverse and/or forward DNS lookup "soft" matches (i.e., approximates) the "HELO" string.

Distributions Based on Observed Behavior Corresponding to the IP Address

Distributions may be formed based on observations obtained over a period of time which may indicate whether the behavior by a machine at a particular IP address is an email forwarder. For example, the maximum and/or average number of emails sent may be indicative of an email forwarder as previously described. Additionally, a determination of the volume of email over an extended period of time may be examined to determine if the amount of email sent over a particular period of time has "spiked". The spike may reference a large number of emails that are sent in groups, thereby indicating that the corresponding IP address is a spammer. An email forwarder, on the other hand, likely has a generally consistent distribution of emails sent over an extended period of time. A variety of other patterns may be formed based on observed behavior of machines at IP addresses over an extended period of time, such as an identified percentage of spam sent from an IP address over a period of time, number of messages sent to a particular email account, number of different email accounts that receive email from the IP address, and so on.

Distributions Based on Observed Behavior Corresponding to Email from the IP Address A variety of characteristics of email itself may also be utilized to form identifying distributions. For example, distributions may be formed which describe a minimum and/or average number of "received" lines in any message from a particular IP address, minimum and/or average number of protocol-level recipients specified in the email, and so on.

Exemplary Procedures

The following discussion describes techniques of identifying email forwarders that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. It should also be noted that the following exemplary procedures may be implemented in a wide variety of other environments without departing from the spirit and scope thereof.

Constructing a Model

In this section, exemplary procedures are discussed which involve techniques for building models to detect email forwarders. It should be noted that these models are just examples of models that may be constructed using the previously described evidence variables. In practice, it is expected that the models will change over time as more email forwarders are identified and as the nature of email changes. For example, spammers may begin to utilize techniques which mimic email forwarders to escape detection as a spammer. Therefore, different weights may be given to different evidence variables as the nature of attacks from spammers change.

Figure 3:
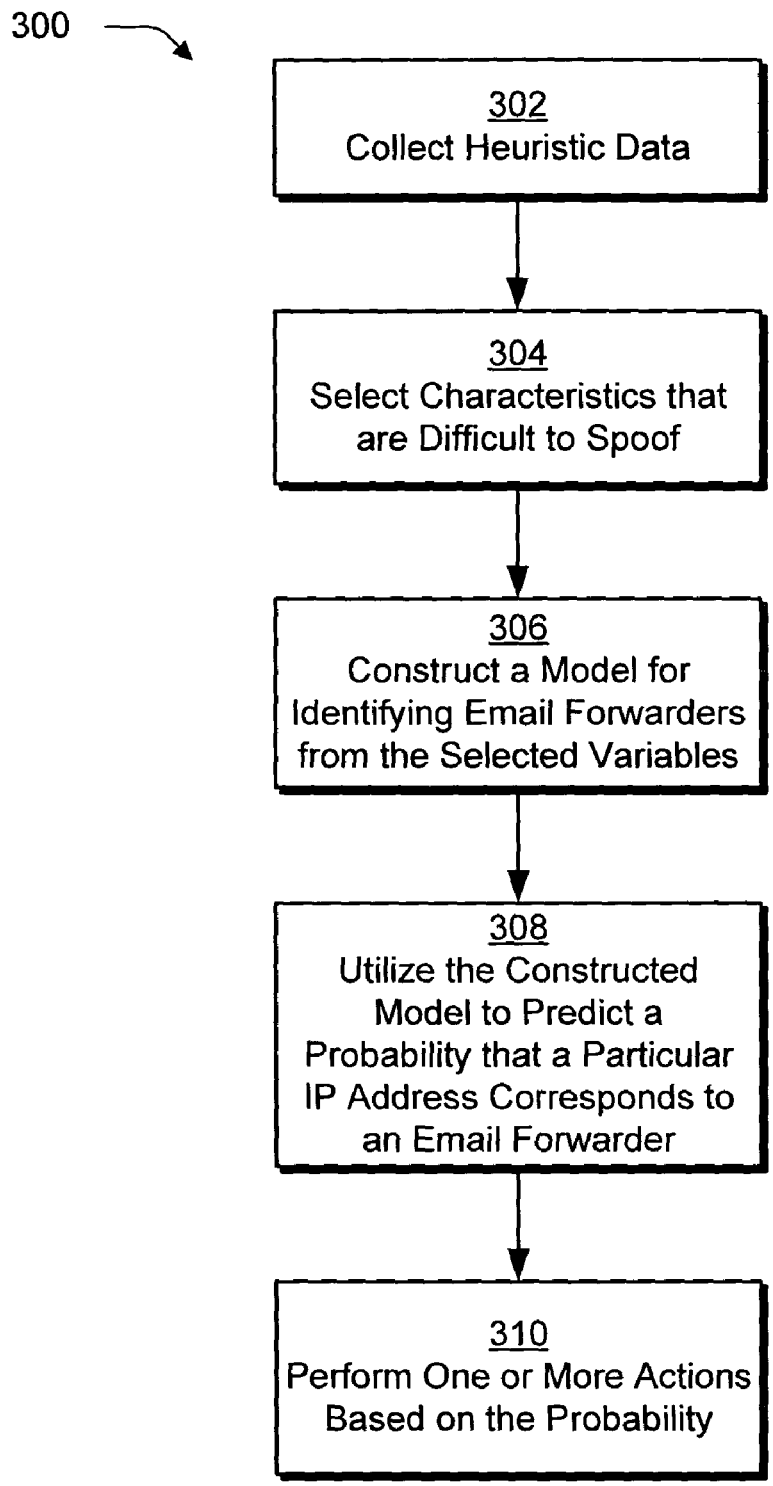
FIG. 3 is a flow diagram depicting a procedure in an exemplary implementation in which a model for identifying an email forwarder is constructed utilizing a plurality of evidence variables.

FIG. 3 is a flow diagram depicting a procedure 300 in an exemplary implementation in which a model for identifying an email forwarder is constructed utilizing a plurality of evidence variables. First, heuristic data is collected that describes characteristics of emails sent from one or more IP addresses (block 302). For example, the heuristic data may be reported by a plurality of clients in which each client describes one or more characteristics of the email received. These characteristics may then be utilized as evidence variables for construction of the model. In another example, the heuristic data may be obtained through observation of the behavior of the IP address (and more particularly the computer(s) associated with the IP address) and/or characteristics of email from that IP address. A variety of evidence variables may be obtained, an exemplary list of which is as follows:

a minimum number of "received" lines in email;
an average number of "received" lines in email;
variance in a number of "received" lines in email;
presence of "forward" in a HELO string of an email;
text in HELO strings in emails from a particular interne protocol (IP) address generally match, one to another;
text in HELO strings in emails from a particular IP address are approximate matches, one to another;
domain that includes a particular IP address;
a top level domain in a HELO string for each email from a particular IP address match, one to another;
an average number of unique hostnames in "received" lines in email from a particular IP address;
an average number of protocol level recipients for email from a particular IP address;
a maximum number of protocol level recipients for email from a particular IP address;
percentage of spam sent from a particular IP address;
a reverse domain name service (DNS) lookup exactly matches a HELO string in an email;
a reverse DNS lookup approximates a HELO string in an email;
a forward DNS lookup exactly matches a HELO string in an email;
a forward DNS lookup approximates a HELO string in an email;
a percentage of times a reverse DNS lookup returns a null value for email from a particular IP address;
a number of different email accounts, to which, a particular IP address sends email;
a maximum number of messages set to a single user account over a defined period of time;
an average number of messages sent to a single user account over a defined period of time;
an amount of time a particular IP address has sent email;
a change in a percentage of email sent from a particular IP address that is spam;
a change in a volume of email sent from a particular IP address;
and so on.

Some of the evidence variables, however, that are utilized to construct the model may be more open to spammer attacks than other evidence variables. As previously described, for instance, a spammer may spoof a HELO string in an email but may not be able to spoof a protocol level indication of the sender. Therefore, a spammer that controls an IP address may modify emails sent from that address such that the IP address resembles an email forwarder, and is thus given preferential treatment in reputation and spoofing systems. Accordingly, in the illustrated procedure 300, a subset of the evidence variables are selected (e.g., through execution of a module, manual selection by a user, and so on) that are difficult or impossible for a spammer to modify (block 304). For instance, such evidence variables may be utilized and exposed such that the email forwarding techniques are protected against being defeated even if a spammer becomes aware of the selected evidence variables, such as when code is deployed in a product, as opposed to when executed on servers controlled by a network operator. Examples of such evidence variables for selection may include evidence variables based on protocol level recipient counts, forward and/or reverse DNS lookups, percent spam from a particular IP address, volume of email from the IP address over time, and so on. The selected evidence variables may then be utilized to construct a model from the heuristic data for identifying whether a particular IP address is an email forwarder (block 306).

The constructed models may be utilized to predict a probability that a particular IP address is an email forwarder (block 308). These probabilities may be utilized in a variety of ways, such as to perform one or more actions based on the respective probability (block 310). For example, the probability may be utilized directly, e.g., as a scaling factor for reducing the reputation given to a particular IP address. In another example, the probability is compared to a threshold. In this other example, an IP address is considered an email forwarder if the probability is higher than the threshold, e.g., the IP address is a forwarder if the model returns a probability that is more than 80% likely to be a forwarder. Further, if the probability exceeds a threshold, a reputation of the IP address preceding the forwarder may be utilized, which we assume to be the true sending IP address. For instance, forwarded email is typically sent from an originator to an email forwarder and then to the intended recipient. Therefore, if the probability indicates that the email was likely forwarded, IP address in a header of the email that precedes the IP address of the email forwarder is likely to be that of the originator. Therefore, the reputation system may examine the email address of the originator to determine if the originator is a spammer, further discussion of which may be found in relation to the following figures.

Figure 4:
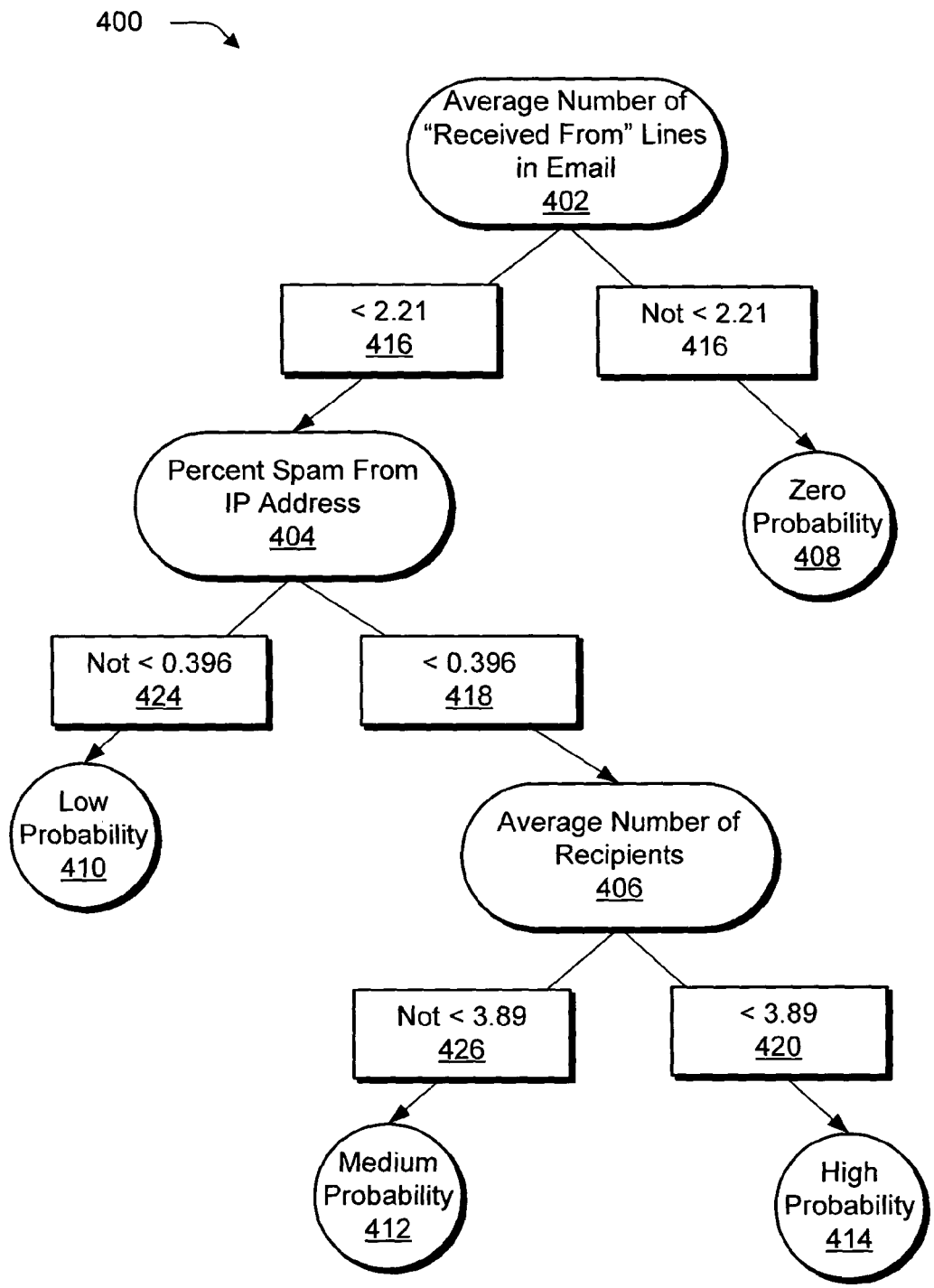
FIG. 4 is an illustration of an exemplary model for identifying email forwarders, and consequently separating email forwarders from non-forwarders.

FIG. 4 is an illustration of an exemplary model 400 for identifying email forwarders, and consequently separating email forwarders from non-forwarders. The model 400 is illustrated as a decision tree having a plurality of leaves. In the following discussion, although a model built using a machine learning technique called "decision tree induction" is described, a variety of other techniques may be utilized without departing from the spirit and scope thereof. A first grouping of the leaves 402-406 correspond to evidence variables (i.e., characteristics) which are utilized to make a decision of where to progress through the decision tree. Another grouping of the leaves 408-414 represents a relative probability value (i.e., a likelihood) that IP addresses reaching that particular leaf is an email forwarder.

As illustrated in FIG. 4, for instance, an IP address that sends emails that average less than 2.21 "received" lines (e.g., block 416), that sends emails that average less than 39.6% spam (e.g., block 418) and that send on average to fewer than 3.89 users at the protocol level (block 420) have a high probability value 414, indicating that the particular IP address likely corresponds to an email forwarder.

In another example, an IP address that sends emails that average more than 2.21 "received" lines (block 422) have a zero probability value 408. In a further example, an IP address that sends emails that average less than 2.21 "received" lines (block 422) and sends more that 39.6% spam (block 424) has a low likelihood value 410. In yet a further example, an IP address that sends emails that average less than 2.21 "received" lines (block 422) and send less that 39.6% spam (block 418) and send emails that have an average number of recipients that is more than 3.89 (block 426) has a medium probability value 412. As shown in each of these examples, the probability values 408-414 may reflect a relative likelihood that the IP address is a spammer. For instance, the probability values may be thought of as "scores" such that a high probability 414 indicates a greater likelihood that a particular IP address is a spammer. Therefore, differing actions may be taken based on these different scores as previously described. It should be noted that the likelihood values may be expressed in a variety of ways, such as a numerical value and so on.

There are a variety of ways in which heuristic data and models may be utilized to identify email forwarders. For example, information gleaned from these methods may be incorporated into the processes used to build models for identifying spam before deploying the models to customers, such as when building an IP address reputation-based model for deployment by an email provider. A reputation based model, for instance, may provide a reputation which describes a likelihood that a particular IP address is a spammer. In this example, IP addresses that are identified as email forwarders are removed from the reputation system altogether, e.g., these IP addresses may be given a neutral reputation when the model indicates that the probability of being an email forwarder is over some threshold. In another instance, a reputation for the IP address is reduced in proportion to how likely (e.g., as indicated by the model) that the IP address is an email forwarder. A reputation of the implied sender may also be utilized, as will be described in greater detail in relation to FIG. 5.

In another example, a list of suspected email forwarders is distributed as part of the regular software updates, via an anti-spam web service, and so on. In an implementation, the IP addresses distributed in this way may be given a neutral reputation, by default, by reputation-based systems or the list may also contain a scaling factor or some other method for incorporating the forwarding information.

In a further example, the models themselves are distributed to customers along with spam filtering products, and may be updated periodically through software updates, via an anti-spam web service, and so on. As previously described, such models may be based on evidence variables that are hard to spoof by malicious parties. For instance, spam-filtering software may periodically execute the email forwarder identifying models on statistics gathered from all of the IP addresses it maintains in its local reputation system. The spam-filtering software may then take action to remove or reduce the reputation placed on IP addresses that are flagged as email forwarders by the models. A variety of actions may be taken based on such identification, further discussion of which may be found in relation to the following figure.

Figure 5:
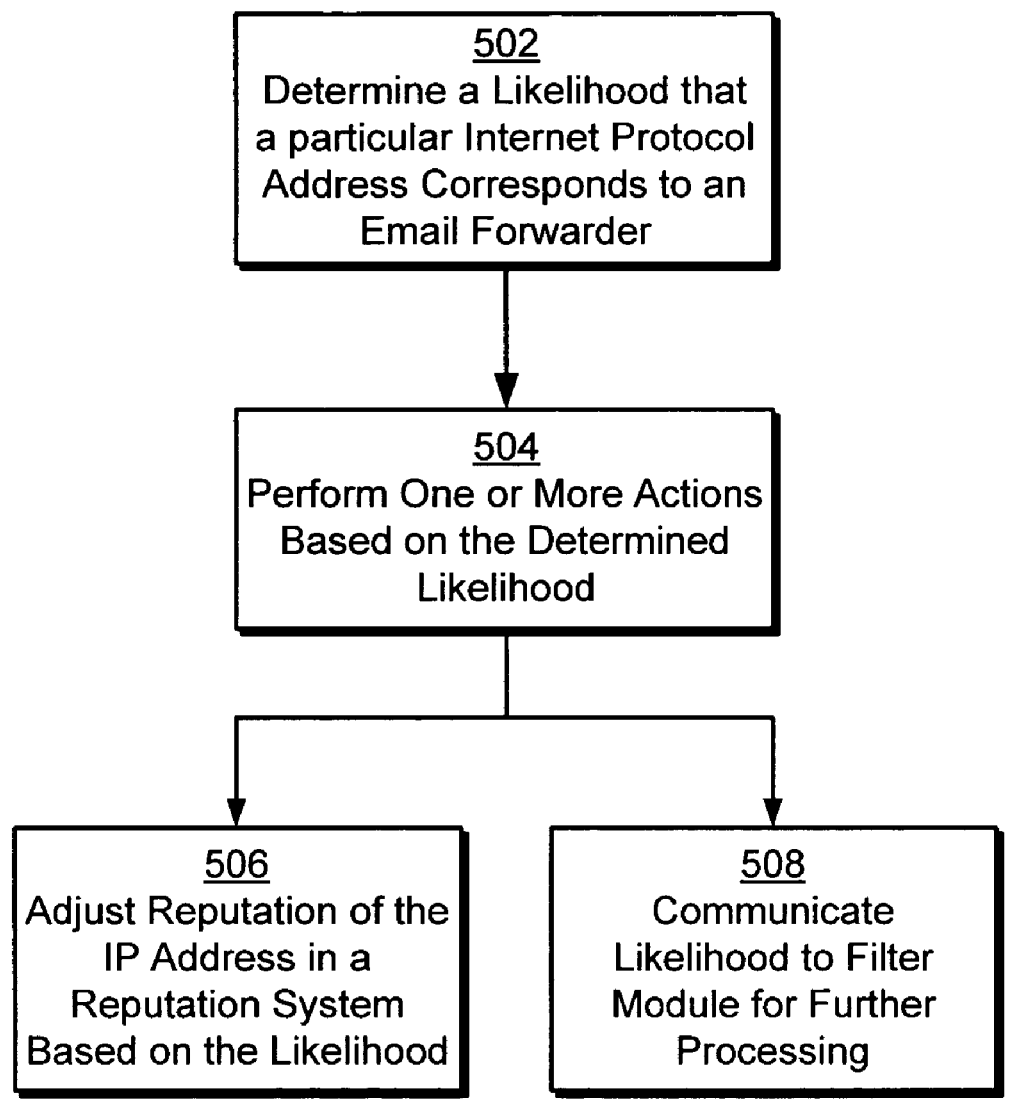
FIG. 5 is a flow diagram depicting a procedure in an exemplary implementation in which a likelihood that a particular IP address corresponds to an email forwarder is computed and actions based on the computed likelihood are performed.

FIG. 5 is a flow diagram depicting a procedure 500 in an exemplary implementation in which a likelihood that a particular IP address corresponds to an email forwarder is computed and actions based on the computed likelihood are performed. First, a likelihood is computed that a particular IP address corresponds to an email forwarder (block 502). For example, the likelihood may be computed utilizing a decision tree and machine learning as previously described. In another example, the likelihood is computed based on a plurality of email received from that particular IP address. For instance, a distribution may be computed from the plurality of evidence variables for email as previously described which indicate whether the IP address has characteristics which are consistent with an email forwarder or spammer. In a further example, the likelihood is computed based on behavior of the particular IP address that is observed over time, such as how long the particular IP address has been sending email, and so on.

Next, one or more actions are performed based on the computed likelihood (block 504). A variety of actions and groups of actions may be performed utilizing the likelihood. For example, a reputation of that particular IP address may be adjusted in a reputation based system for locating spammers (block 506). As previously described, a reputation based system may include reputations which indicate to various degrees whether a particular IP address referenced by the reputation system is a spammer. Therefore, once the particular IP address is identified as an email forwarder, that IP address may be removed from the reputation system by giving it a "neutral" reputation, have the magnitude of its reputation reduced in proportion to the likelihood that it is an email forwarder, and so on. The effects of an IP addresses' "reputation" may take a variety of forms, such as by affecting an estimate of the likelihood that the sender is a spammer, an estimate of the likelihood that a random message from the sender is spam, and so on. If so, it should be noted that these may diverge since an email forwarder is not a spammer, but a message received from a forwarder may be spam. In an implementation, these actions are applied to the particular IP address only if it has a negative reputation, while leaving any "good" reputation (i.e., the particular IP address is not a spammer) unchanged.

In another example, the likelihood is communicated to a filter module for further processing (block 508). For example, the identifier module 124(*n*) of FIG. 2 may communicate to the filter module 120(*n*) the likelihood such that processing of emails from that particular IP address by the filter module 120(*n*) takes into account the relative likelihood that the particular IP address is an email forwarder. For instance, if an email from the particular IP address fails an anti-spoofing test, but that particular IP address is likely an email forwarder, the filter module 120(*n*) may treat the email less severely such that the failure has less effect on determining whether the email is spam. The magnitude of this effect for anti-spoofing can be hand tuned or set via machine learning and distributed as part of software updates or via an anti-spam web service as previously described.

Information about failed anti-spoofing tests may be incorporated in a variety of different ways. For example, a failed anti-spoofing check on an email from an IP address that is suspected of being an email forwarder is not penalized as severely as a failed check on a message from an IP address that is clearly not an email forwarder. In another example, the fact that anti-spoofing checks are failing consistently for an IP address may be used as evidence that the IP address is an email forwarder, especially when the checks that are failing are for emails that are clearly not spam by other metrics (e.g., user feedback, content-based spam filters, and so on).

Figure 6:
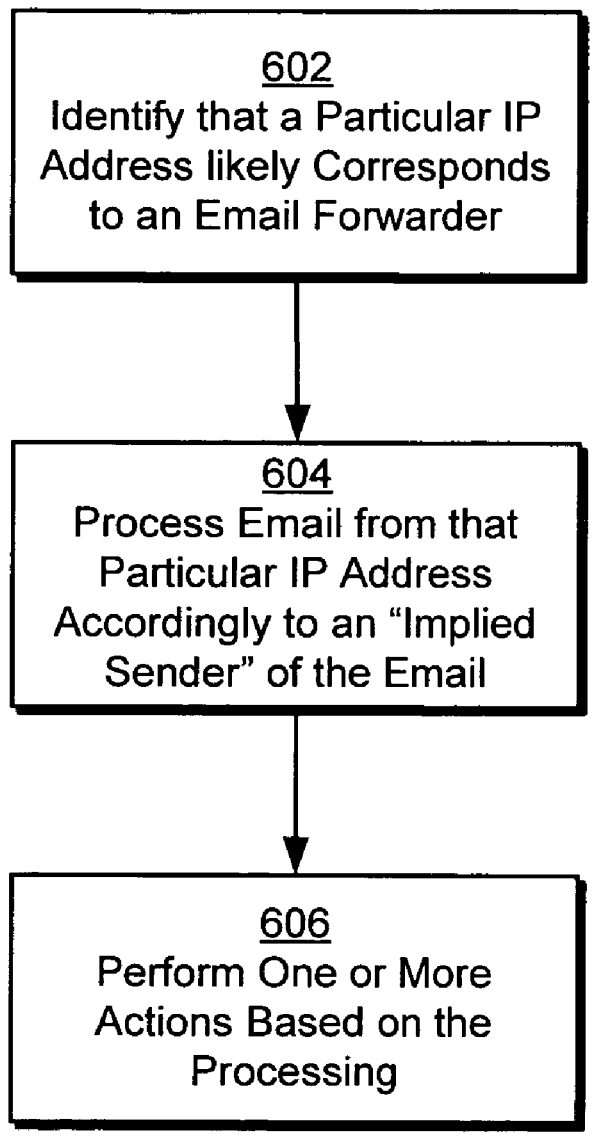
FIG. 6 is a flow diagram depicting a procedure in an exemplary implementation in which an identification that an IP address corresponds to an email forwarder is utilized to process an email from the IP address according to an "implied sender" of the email.

FIG. 6 is a flow diagram depicting a procedure 600 in an exemplary implementation in which an identification that an IP address corresponds to an email forwarder is utilized to process an email from the IP address according to an "implied sender" of the email. In this implementation, an "implied sender" is utilized to process email, such as accordingly to a reputation system. For example, as email is sent from one machine to another, "received" lines are "prepended" (put at the beginning) of the email. These "received" lines include the IP address of the sender. Thus, if a particular IP address is identified as an email forwarder (block 602), an identifier module and/or filter module may look at the line "below" (i.e., following) the IP address of the email forwarder in the email. This next IP address is assumed to be the IP address, from which, the email forwarder received the email. In other words, this may be considered the "implied sender" of the email. In another instance, email may travel from one computing device to another (and so on) inside of an email forwarding organization, e.g., a university. To deal with this instance, the identifier module and/or filter module may "look" several "received" lines "down" in the email header. This may be performed by iteratively applying the email forwarder identifying techniques described herein. That is, after determining that an IP address corresponds to an email forwarder, the identifier module may remove "received" lines with that address from the header and then repeat the techniques described herein. Other heuristics may also be utilized to determine the implied sender.

Email from the particular IP address is then processed according to the "Implied Sender" of the email (block 604) and then one or more actions are performed based on the processing (block 606). For example, the filter module (e.g., a spam filter) may then process the email using a reputation system which uses the reputation of the implied sender of the email for further processing and then route the email based on this processing. The implied sender may also be utilized for a variety of techniques, such as for anti-spoofing and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by one or more processors executing instructions stored in one or more computer-readable storage media, the method comprising:
   providing, by the one or more processors, a spam filtering mechanism for identifying spammers in an electronic mail (email) system;
   identifying, by the spam filtering mechanism provided by the one or more processors, certain Internet Protocol (IP) addresses as spammers based at least in part upon feedback data from recipients of email sent from the certain IP addresses;
   using heuristics, by the one or more processors, to distinguish between the spammers and an email forwarder that performs a forwarding functionality for the recipients, the heuristics determining that a particular IP address of the email forwarder does not belong to a spammer when a particular recipient receives more than a predetermined minimum number of emails from the particular IP address of the email forwarder over a predetermined period of time and more than a predetermined percentage of the emails received from the particular IP address are marked as spam by the particular recipient in feedback data when the emails are received by the particular recipient;
   following the determination that the particular IP address of the email forwarder does not belong to one of said spammers, treating email received from the particular IP address of the email forwarder differently than email received from the certain IP addresses identified as spammers; and
   following distinguishing between the spammers and the email forwarder, forming a hint for communication to the spam filtering mechanism, wherein the spam filtering mechanism performs an action that is configured to determine whether subsequent email received from the email forwarder is spam based at least in part on the hint, wherein:
   the action includes adjusting a reputation for the particular IP address of the email forwarder in a reputation system, and
   the reputation system is used by the spam filtering mechanism to identify whether each of a plurality of IP addresses corresponds to a spammer.

2. A method as described in claim 1, wherein:
   the heuristics include the feedback data from the recipients;
   the feedback data is provided by a plurality of the recipients; and
   the feedback data from each said recipient describes a plurality of emails received by the recipient for identifying the emails as spam, wherein the number of emails identified as spam out of the total number of emails received from the email forwarder over the predetermined period of time exceeds the predetermined percentage for determining that the particular IP address of the email forwarder does not belong to a spammer.

3. A method as described in claim 2, wherein the feedback data from the recipients of the email is applied by the spam filtering mechanism in a reputation system that describes a likelihood that a certain IP address is a spammer.

4. A method as described in claim 1, wherein the heuristics for determining that the particular IP address of the email forwarder does not belong to a spammer include a comparison to an observed distribution of evidence variables that describe email behavior at a plurality of IP addresses.

5. A method as described in claim 1, wherein the heuristics for determining that the particular IP address of the email forwarder does not belong to a spammer include use of a plurality of evidence variables which are indicative of whether an IP address corresponds to the email forwarder instead of a spammer.

6. A method as described in claim 5, wherein one or more of the evidence variables are selected from a group consisting of:
   minimum number of "received" lines in email;
   average number of "received" lines in email; and
   variance in a number of "received" lines in email.

7. A method as described in claim 5, wherein one or more of the evidence variables are selected from a group consisting of:
   presence of "forward" in a HELO string of an email;
   text in HELO strings in emails from a particular IP address generally match, one to another;
   text in HELO strings in emails from a particular IP address are approximate matches, one to another; and
   top level domain in a HELO string for each email from a particular IP address match, one to another.

8. A method as described in claim 5, wherein one or more of the evidence variables are selected from a group consisting of:
   domain that includes a particular IP address;
   average number of unique hostnames in "received" lines in email from a particular IP address;

average number of protocol level recipients for email from a particular IP address;
maximum number of protocol level recipients for email from a particular IP address;
percentage of spam sent from a particular IP address;
a percentage of times a reverse DNS lookup returns a null value for email from a particular IP address;
a number of different email accounts, to which, a particular IP address sends email;
a maximum number of messages sent to a single user account over a defined period of time;
an average number of messages sent to a single user account over a defined period of time;
an amount of time a particular IP address has sent email;
a change in a percentage of email sent from a particular IP address that is spam; and
a change in a volume of email sent from a particular IP address.

9. A method as described in claim 5, wherein one or more of the evidence variables are selected from a group consisting of:
reverse domain name service (DNS) lookup exactly matches a HELO string in an email;
reverse DNS lookup approximates a HELO string in an email;
forward DNS lookup exactly matches a HELO string in an email; and
forward DNS lookup approximates a HELO string in an email.

10. A method as described in claim 5, wherein at least one said evidence variable is selected from a plurality of evidence variables based on difficulty of a spammer to spoof the at least one said evidence variable.

11. A method as described in claim 1, further comprising:
determining an implied sender of subsequent emails forwarded from the identified email forwarder by examining a header of each of the subsequent emails, said implied sender having initially sent the email to the email forwarder; and
processing the subsequent emails forwarded by the email forwarder according to a reputation applied to the implied sender by the spam filtering mechanism instead of a reputation applied to the email forwarder.

12. Computer-readable memory containing processor-executable instructions adapted to be executed by one or more processors to implement a method comprising:
determining, by a management module, a determined likelihood that a particular Internet Protocol (IP) address corresponds to an authorized email forwarder for identifying the particular IP address as belonging to the authorized email forwarder rather than belonging to a spammer,
wherein an email recipient having a first email account handled by the authorized email forwarder specifies that the authorized email forwarder is to forward email addressed to the email recipient's first email account to a second email account of the email recipient, the second email account being handled by the management module,
determining, by the management module, that the authorized email forwarder is not a spammer based on receiving more than a minimum number of emails at the second email account from the particular IP address of the authorized email forwarder over a predetermined period of time, and having more than a predetermined percentage of the emails received during the predetermined period of time marked as spam by the recipient in feedback data when the emails are received at the second email account;
distinguishing, by the management module, between spammers and the authorized email forwarder based on the determined likelihood, wherein, when the particular IP address is indicated to belong to the authorized email forwarder based upon the determined likelihood, the particular IP address is not designated as belonging to a spammer despite forwarding spam to the recipients; and
processing subsequent email originating from the particular IP address based on the determined likelihood, wherein the subsequent email indicated as being sent by the authorized email forwarder is treated differently from email indicated as originating from spammers.

13. The computer-readable memory, as described in claim 12,
wherein the determining the determined likelihood further includes:
aggregating a plurality of emails received from the particular IP address of the authorized email forwarder at a plurality of second email accounts handled by the management module; and
using a plurality of evidence variables which are indicative of whether the particular IP address corresponds to the authorized email forwarder instead of a spammer,
wherein the evidence variables are obtained by the management module from observed behavior corresponding to the particular IP address and characteristics of the plurality of emails sent from the particular IP address of the authorized email forwarder, the characteristics being determined from aggregating the plurality of emails sent to the plurality of second email accounts.

14. The computer-readable memory as described in claim 13, wherein the evidence variables are selected from a group consisting of:
minimum number of "received" lines in email;
average number of "received" lines in email;
variance in a number of "received" lines in email;
presence of "forward" in a HELO string of an email;
text in HELO strings in emails from a particular internet protocol (IP) address generally match, one to another;
text in HELO strings in emails from a particular IP address are approximate matches, one to another;
domain that includes a particular IP address;
top level domain in a HELO string for each email from a particular IP address match, one to another;
average number of unique hostnames in "received" lines in email from a particular IP address;
average number of protocol level recipients for email from a particular IP address;
maximum number of protocol level recipients for email from a particular IP address;
percentage of spam sent from a particular IP address;
reverse domain name service (DNS) lookup exactly matches a HELO string in an email;
reverse DNS lookup approximates a HELO string in an email;
forward DNS lookup exactly matches a HELO string in an email;
forward DNS lookup approximates a HELO string in an email;
a percentage of times a reverse DNS lookup returns a null value for email from a particular IP address;
a number of different email accounts, to which, a particular IP address sends email;

a maximum number of messages set to a single user account over a defined period of time;

an average number of messages sent to a single user account over a defined period of time;

an amount of time a particular IP address has sent email;

a change in a percentage of email sent from a particular IP address that is spam; and a change in a volume of email sent from a particular IP address.

15. The computer-readable memory as described in claim 12, wherein the method further comprises:

determining an implied sender of the subsequent emails forwarded from the authorized email forwarder by examining a header of each of the subsequent emails, said implied sender having initially sent the email to the authorized email forwarder; and processing the subsequent emails forwarded by the authorized email forwarder according to a reputation applied to the implied sender by the spam filtering mechanism instead of a reputation applied to the authorized email forwarder.

16. A system comprising:

a server having one or more processors for executing processor-executable instructions stored in a memory for configuring the server to receive email, wherein a recipient of email at a first email account specifies that the email is to be automatically forwarded by a legitimate email forwarder handling said first email account to a corresponding second email account of the recipient handled by the server, the server comprising a spam filtering mechanism for identifying spammers, said server acting as an email provider handling the second email account, said second email account being subject to the spam filtering mechanism;

the server further comprising an identifier module configured to collect heuristic data that describes characteristics of emails sent from one or more Internet Protocol (IP) addresses including the emails forwarded from the first email account to the second email account;

the identifier module being configured to identify certain IP addresses as spammers based at least in part upon feedback from recipients of email sent from the certain IP addresses, the certain IP addresses identified as spammers being penalized by treating email received therefrom as spam;

the identifier module being configured to construct a model from the heuristic data for identifying a particular IP address, which would otherwise be identified and penalized as a spammer, as belonging to the legitimate email forwarder specified by the recipient to forward email from the first email account handled by the legitimate email forwarder to the second email account handled by the server the model comprising a determination that the legitimate email forwarder is not a spammer when more than a minimum number of emails are received at the second email account from the particular IP address of the legitimate email forwarder over a predetermined period of time, and more than a predetermined percentage of the emails received during the predetermined period of time are marked as spam by the recipient in feedback data when the emails are received at the second email account;

the identifier module being configured to identify, to the spam filtering mechanism, based on the model, the legitimate email forwarder handling the first email account for subjecting the email received from the legitimate email forwarder to a lower level of scrutiny by the spam filtering mechanism than email received from other sources not identified as the legitimate email forwarder; and the identifier module being configured to instruct the spam filtering mechanism to provide an exemption for the legitimate email forwarder, whereby the legitimate email forwarder is not penalized as a spammer despite forwarding spam to the second email account of the recipient.

17. A system as described in claim 16, further comprising:

wherein the identifier module is further configured to determine an implied sender of subsequent emails forwarded from the first email account by examining a header of each of the subsequent emails, said implied sender having initially sent the subsequent email to the legitimate email forwarder; and wherein the server is further configured to process the subsequent emails forwarded from the first email account according to a reputation applied to the implied sender by the spam filtering mechanism instead of a reputation applied to the legitimate email forwarder.

18. A system as described in claim 17, wherein the implied sender is identified by examining received lines pre-pended to each subsequent email that include a first IP address of the legitimate email forwarder, and that further include a second IP address assumed to be that of the implied sender that initially sent the subsequent email to the email forwarder.

* * * * *